Patented Mar. 12, 1946

2,396,398

UNITED STATES PATENT OFFICE 2,396,398

POLISHING MATERIAL AND PROCESS OF MAKING SAME

Forrest L. Turbett, Joplin, Mo., assignor to The Eagle-Picher Company, Cincinnati, Ohio, a corporation of Ohio No Drawing. Application April 6, 1944, Serial No. 529,854

5 Claims. (Cl. 51—307)

This invention relates to a polishing material especially adapted to polishing glass.

In the present state of the art, rouge, i. e. ferric oxide, is the only material which is used on a large scale for this purpose. Two types are used, one being the chemically precipitated and roasted oxide and the other being a natural rouge imported from the Persian Gulf.

According to the present invention, I make a material which is excellent for the purpose and substantially devoid of scratchy particles. The product is also useful as a pigment. In making this product I use waste materials, i. e. slags or mixtures of slags and pyrites. According to sedimentation curves which may be drawn from data hereinafter given, my material compares in particle size distribution and substantially equals approved material now being used commercially.

One of the raw materials which I prefer to use is blast furnace slag from a lead ore smelting furnace. My only requirement of this slag is that it contain at least 30% by weight of iron oxide. The oxide usually occurs as FeO. Slags which I have found satisfactory are those which are produced from the smelting of lead-zinc sulfide ores from the tri-state district (Missouri-Oklahoma-Kansas). Slags from any ore of this nature which is associated with siliceous gangue would be satisfactory regardless of the kind of furnace employed. The analyses given below cover a range of slags from lead smelting operations, such slags being such as occur in the district referred to. They have been found to yield a satisfactory product:

| | Percent by weight |
|---|---|
| ZnO | 5 –15 |
| CaO | 5 –20 |
| FeO | 30 –40 |
| SiO$_2$ | 25 –40 |
| PbO | 1 – 4 |
| MgO | 0.5– 2 |
| Al$_2$O$_3$ | |

My other raw material is by-product iron pyrites, similar to that recovered, for example in coal washeries. Primary iron pyrites, if pure, can also be used.

The slag should be crushed to pass a 10 mesh U. S. standard sieve, and the pyrites should not have particles which measure over ¼" diameter. 50% by weight of each material is preferably used. Although I may vary the proportions of each to between 30% and 70% of the total batch.

I grind the mixture with one part water to one part solid in a steel lined ball mill with steel or granite balls for about 24 hours. Only an ordinary speed of the ball mill is necessary. After this operation, I allow a short settling period and pour off the supernatant liquid to use for the next batch. The largely de-watered moist slurry is placed in a mechanically rabbled furnace and slowly heated to remove water. After the evaporation of the water, I heat to 1500–1800° F. under oxidizing conditions and hold the temperature until the color of a cooled sample of the furnace charge is of a clear yellowish red. 3 to 6 hours are necessary to reach this stage. I have found that the presence of the sulfur compounds in the pyrites is desirable to catalyze the oxidation of the iron contained in the slag. A stronger and brighter color seems to result. After furnacing is complete, the charge is cooled and again placed in a ball mill. The product is again ground for about 24 hours using the same proportion of water as before, but this time a porcelain lined mill and porcelain balls are used exclusively. The grinding is continued for about 24 hours. The entire charge is then diluted to about 2% to 4% content of solids and subjected to a hydroseparation step. For this purpose a so-called "classifier" is used, this being a tank provided with agitator and a "launder" for throwing floating particles over a lip, thus separating the floatable material from the non-floatable. I recover the fine particles and reject the coarse ones.

To the suspension passing the "launder" I add a small amount, say 2% based on solids present, of a flocculating agent which may be lime water, or a solution of a water-soluble carbonate such as a sodium carbonate or sulfate such as sodium sulfate. These solutions are used in concentrated form. The flocculated precipitate is recovered and dried preferably by filtration, washing and moderate heating, say to 350° F. After cooling, it is disintegrated in a hammermill such as the Micro until the desired grade of subdivision has been reached. It is now a yellowish red powder which is very soft and of extreme fineness.

While I have described my preferred raw material as a mixture of lead reducing furnace slag and pyrites, I may use pyrites only. In such case my product is deep red. In order that all of my products shall be recognized from their particle size distribution as well as their other characteristics, I append a table showing the particle size distribution of two products made as described and also of a third, the latter being the commercial material, not of my manufacture, which is at present in use. Other characteristics of my product regardless of whether made from purities only or pyrites and slag are extreme softness and easily wetability in oils or other liquids and absence or grittiness.

*Particle size distribution*

| Type | Pyrites and slag | Pyrites only | Present commercial |
|---|---|---|---|
| Radius (microns): | | | |
| 0–.03 ............ per cent.. | 6.0 | 8.5 | 7.2 |
| .03–.06 .................do.... | 7.0 | 8.5 | 6.6 |
| .06–.125 ................do.... | 11.0 | 12.0 | 9.7 |
| .125–.25 ................do.... | 13.0 | 15.0 | 13.5 |
| .25–.50 .................do.... | 12.0 | 17.0 | 16.5 |
| .50–1 ...................do.... | 14.0 | 13.0 | 15.5 |
| 1–2 .....................do.... | 15.0 | 10.5 | 12.2 |
| 2–4 .....................do.... | 13.0 | 8.7 | 10.5 |
| 4–8 .....................do.... | 8.0 | 5.8 | 6.1 |
| 8–16 ....................do.... | 1.0 | 1.0 | 2.2 |
| Specific surface ....sq. m./gram.. | 4.70 | 5.74 | 4.18 |
| Specific radius ........microns.. | 0.17 | 0.14 | 0.17 |
| Median radius ............do.... | 0.54 | 0.32 | 0.45 |

I claim as my invention:

1. The process of making a material suitable for polishing glass which comprises heating a finely divided, hydrated furnace-charge comprising a substantial proportion of iron pyrites to a temperature between 1500° and 1800° F. for about three hours under oxidizing conditions, cooling the charge, finely grinding it with water, separating the fine particles from the coarse ones in water, flocculating and collecting the fine particles, heating them moderately to drive off free water and then reducing the dried product to extreme fineness.

2. The process of making a material suitable for polishing glass which comprises mixing slag within the following table of analysis:

| | Per cent |
|---|---|
| ZnO | 5–15 |
| CaO | 5–20 |
| FeO | 30–40 |
| SiO₂ | 25–40 |
| PbO | 1–4 |
| MgO | 0.5–2 |
| Al₂O₃ | | from the smelting of a siliceous lead-zinc ore, with iron pyrites in the following proportions:

| | Per cent |
|---|---|
| Slag | 30 to 70 |
| Pyrites | 70 to 30 | grinding the mixture with a substantial quantity of water for about 24 hours, removing excess water, heating the solid ground material to between 1500° to 1800° F. for about 3 hours under oxidizing conditions, cooling the charge, finely grinding it with water, separating the fine particles from the coarse ones in water, flocculating and collecting the fine particles, heating them moderately to drive off free water and then subdividing the dried product to extreme fineness.

3. A polishing material suitable for polishing glass, said material being soft, very finely divided, substantially free from gritty particles capable of making visible scratches on glass, high in iron oxides and of a strong red or yellowish red color and having been produced from a slag having an analysis falling within the range:

| | Per cent |
|---|---|
| ZnO | 5–15 |
| CaO | 5–20 |
| FeO | 30–40 |
| SiO₂ | 25–40 |
| PbO | 1–40 |
| MgO | 0.5–2 |
| Al₂O₃ | | together with from 30% to 70% by weight of iron pyrites.

4. A polishing material suitable for polishing glass, said material being soft, very finely divided, substantially free from gritty particles capable of making visible scratches on glass, said material comprising essentially a mixture of finely powdered iron oxides and the finely powdered constituents of slag having the following composition range:

| | Per cent by weight |
|---|---|
| ZnO | 5 to 15 |
| CaO | 5 to 20 |
| FeO | 30 to 40 |
| SiO₂ | 25 to 40 |
| PbO | 1 to 4 |
| MgO | 0.5 to 2 |

5. A polishing powder suitable for polishing glass, said material being soft, very finely divided, substantially free from gritty particles capable of making visible scratches on glass, said polishing powder comprising essentially finely powdered roasted iron pyrites.

FORREST L. TURBETT.